Figure 1:
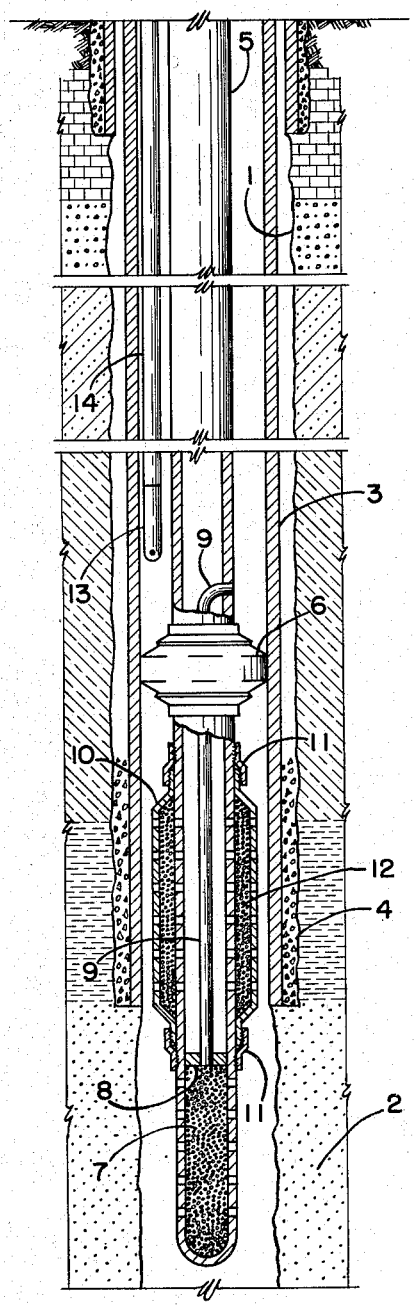

Patented Sept. 19, 1950

2,523,091

UNITED STATES PATENT OFFICE 2,523,091

OIL-WATER SEPARATOR FOR WELLS

William A. Bruce, Tulsa, Okla., assignor to Standard Oil Development Company, a corporation of Delaware Application June 4, 1945, Serial No. 597,407

5 Claims. (Cl. 166—2)

The present invention is directed to apparatus for separating oil from water in a well producing oil and water.

The principal object of the present invention is the provision of apparatus which will make possible a separation of oil from water at the point of entry of a mixture of the two from a formation containing them into a bore hole, and the separate withdrawal of these liquids from the bore hole.

An additional object of the present invention is to provide at the point of entry of a mixture of oil and water into a bore hole from a formation containing the two a preliminary separation zone, a path of egress to the surface for the oil, which is rendered substantially impassable by water, and a path of egress to the surface for the water, which is rendered substantially impassable by the oil.

According to the present invention, the path of egress of the oil to the surface includes a portion which is packed with material which is preferentially oil-wettable. This material may be sand, or fine gravel coated with substances which are preferentially oil-wettable, such as, heavy metal salts of fatty acids, as for example, lead oleate, oil-soluble, water-insoluble sulphonates of petroleum origin, oil-wettable synthetic resins or the like. Instead of using sand or gravel preformed porous bodies composed of aluminous or siliceous materials such as Alundum, or the like, may be employed and these may be coated with any of the preferentially oil-wettable materials heretofore specified. With such materials, however, it is desirable to use silicones which are preferentially oil-wettable, such as silicones of the methyl type, as the coating material. Alternatively, the solid granular material itself may be preferentially oil-wettable material, such as lead sulfide, or certain forms of graphite or carbon.

According to the present invention, the path of egress of the water to the surface is rendered substantially impassable by oil by including in it a portion which is preferentially wettable by water and substantially non-wettable by oil. This material may be sand, or fine gravel, or other granular material coated with suitable oil-insoluble wetting agents, such as oil-insoluble petroleum sulfonates. In a large measure, granular material which is preliminarily thoroughly wetted with water remains preferentially water wettable and substantially unwettable by oil, and aluminous bodies, such as Alundum, for example, if thoroughly wetted with water, remain in this condition, unless treated with an agent which will remove the water and render the surface oil-wettable. Thus, for the path of egress of the water, it is sufficient that one portion of the path be made up of water-wet material. It is preferred, however, that this material be rendered more preferentially water wettable by previous treatment with wetting agents of the type heretofore referred to. In this connection it may be mentioned that many synthetic resins, such as phenol-aldehyde type resins, if preliminarily wetted with water will resist wetting by oil, and the use of a water-wet pack of granules of such resins or granules of other materials coated with such resins, is contemplated in the practice of the present invention.

Figure 2:
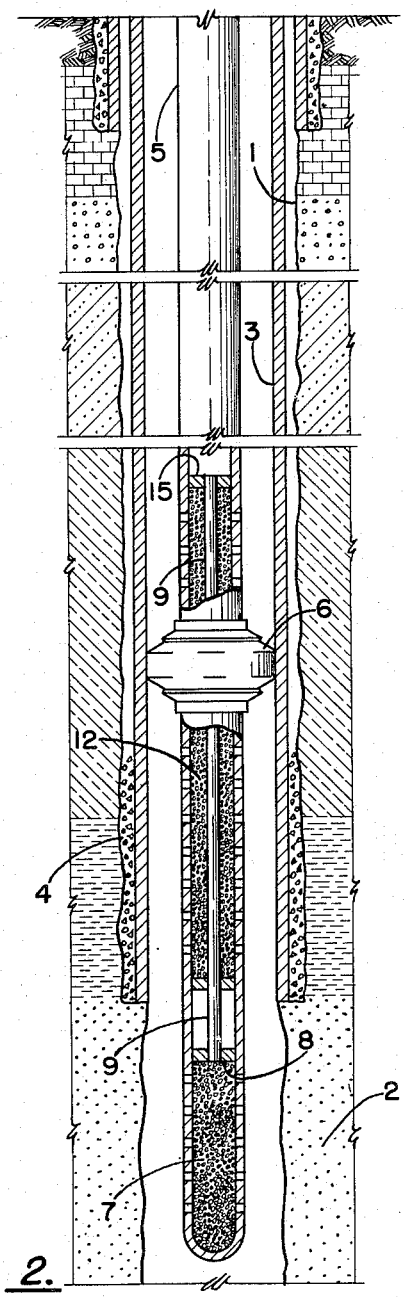

The nature of the present invention may be more clearly understood from the following detailed description of the accompanying drawing, in which, Fig. 1 is a vertical section of a bore hole in which is installed one embodiment of said invention; and Fig. 2 is a vertical section of a bore hole in which is installed an alternative embodiment of said invention.

Referring to the drawing in detail numeral 1 designates a bore hole extending to the surface from a formation 2 which discharges oil and water. The casing 3 is set in the bore hole and cemented in place as at 4.

In completing the hole according to the present invention, a producing string of tubing 5 having its lower end perforated for a considerable length thereof and carrying a packer 6 above said perforations, is lowered into the casing. This tubing has its extreme lower end packed with water-wettable granular material 7. The granular pack 7 is sealed off at its upper end by a disc 8 in which is fixed a tube 9, which extends upwardly into the tubing 5 to a point above the packer 6, where it discharges through the side of the tubing into the annular space between the tubing and the casing.

Between the packer 6 and the pack 7 the perforated portion of tubing 5 is covered by perforated sleeve 10, which is fixed to the tubing 5 in any suitable manner, as by a threaded collar 11. The space between the perforated sleeve and the perforated portion of tubing 5 contains a pack 12 of preferentially oil-wettable material of the character heretofore defined.

The tubing 5, fabricated as above discussed, is lowered into a position such that the lower perforated end of the tubing is substantially opposite the lower side of the producing formation 2. Packer 6, which may be any of the conventional types, is then set and production is started by removing drilling mud and other debris from the bore hole in the usual manner so as to initate the flow of fluid from the formation toward the surface. While the sleeve 10 is shown in position immediately above pack 7 in the drawing, it will be understood that there may be considerable distance between the lower end of sleeve 10 and the upper end of pack 7, depending upon the efficiency of the water and oil separation adjacent to the assembly. It will be understood that where there is space between these elements, tubing 5 will be unperforated between them. In fact, in actual practice, it is preferred to have the lower end of the sleeve 10 arranged at a distance of at least about 10 feet above the upper end of pack 7, so as to insure that mainly oil will seek its way through sleeve 10 and mainly water will seek its way through pack 7.

With the assembly portioned as shown, a mixture of oil and water is discharged from the exposed walls of the formation 2 into the bore hole. A gravity separation of these two components tends to take place immediately with the water settling to the bottom, the oil coming to the top. Since the pack 7 is preferentially water-wettable, and usually preliminarily water-wet, it will permit the passage of water to the exclusion of oil. The water will pass upwardly through tube 9 into the casing above packer 6. Where the formation pressure is insufficient to force the water to the surface, an auxiliary tubing 13 is lowered into the casing outside tube 5 with its upper end connected to a discharge tube at the surface, and its lower end provided with a suitable pump 14, indicated symbolically. The oil passes through the pack in sleeve 10, water being substantially excluded by virtue of the nature of the pack. This oil rises in producing string 5 to the surface, aided if required by a conventional bore hole pump.

In Fig. 2 is shown an embodiment in which water is produced through the producing string, while oil is produced through the casing. In this embodiment, the tubing 5 has its extreme lower end perforated and provided with a pack of preferentially water-wettable material 7. The disc 8 and tubing 9 are provided as in Fig. 1, except in this case the upper end of the tubing passes through the center of disc 15 fixed in the tubing 5. Any desired portion of the tube 5 between the discs 8 and 15 may be perforated and packed with oil-wettable material 12. The packer 6 in this case is so arranged that part of the perforated portion of tubing 5 packed with preferentially oil-wettable material extends above the top of the packer so that oil may pass into pack 12 below the packer, and out of the pack 12 into the casing above the packer. As in the embodiment shown in Fig. 1, an auxiliary pump may be employed to pump the oil to the surface where the formation pressure is inadequate for this purpose.

It will be readily appreciated that the arrangements discussed above may be modified to a considerable extent without departing from the principles involved. All such modifications are contemplated within the scope of the present invention.

The nature and objects of the present invention having been thus described and illustrated, what is claimed as new and useful and is desired to be secured by Letters Patent is:

1. An apparatus for producing oil and water separately from a well producing both which comprises a casing in said well, a tubing arranged in said casing and extending to the surface for conducting one of said fluids from said well to the surface, a packer between said tubing and said casing above the level of production of said fluids, means for conducting fluid from said well below said packer into said casing above said packer, said conducting means including a filter pack of a character to selectively pass one of said fluids and means for conducting fluid into said tubing, said last named means including a second filter pack of a character to selectively pass the other of said fluids.

2. An apparatus for producing oil and water separately from a well tapping a subterranean formation which discharges both comprising a casing in said well between the surface and said formation, a tubing hung in said casing from the surface to a point adjacent said formation, a packer between said tubing and said casing above said formation, a pair of filter packs each defining a separate path of fluid flow carried by said tubing below the packer, one of said filter packs being selectively permeable to oil and the other being selectively permeable to water, one of said packs being arranged to discharge its effluent into said tubing for passage to the surface and the other of said packs being arranged to discharge its effluent into said casing above said packer and outside of said tubing for passage to the surface.

3. An apparatus for producing oil and water separately from a well penetrating a subterranean formation which discharges both comprising a casing between the surface and said formation, a tubing suspended from the surface in said casing, a packer between said tubing and said casing above said formation, a nipple on said tubing extending below said packer and provided with two perforated portions separated by an imperforate portion, a filter pack defining a path of fluid flow arranged between said imperforate portion and said packer of a character to selectively pass one of said fluids and a second filter pack defining a second path of fluid flow arranged between said imperforate portion and the end of said nipple of a character to selectively pass the other of said fluids, one of said packs being arranged to discharge its effluent into said tubing for passage to the surface and the other of said packs being arranged to discharge its effluent into said casing above said packer for passage to the surface.

4. An apparatus for producing oil and water separately from a well penetrating a subterranean formation which discharges both comprising a casing between the surface and said formation, a tubing hung in said casing, a packer between said tubing and said casing above said formation, a nipple connected to said tubing and extending below said packer having two perforated portions separated by an imperforate portion, a filter pack of a character to selectively pass one of said fluids arranged about the upper perforated portion of said nipple, a filter pack of material of a character to selectively pass the other of said fluids arranged to filter fluid passing through the lower perforated portion of said nipple, a seal in said imperforate portion of said nipple and a tubing connecting the portion of said nipple below said seal with said casing above said packer.

5. An apparatus for producing oil and water separately from a well penetrating a subterranean formation which discharges both comprising a casing between the surface and said formation, a tubing hung in said casing, a packer between said tubing and said casing above said formation, said tubing being perforated above said packer, a nipple on said tubing extending below said packer having an upper and a lower perforated portion separated by an imperforate portion, a transverse partition in said imperforate portion, a transverse partition in said tubing above its perforated portion, a tubing passing through said transverse partitions for conducting fluid from a point below the lower one to the tubing above the upper one, a pack of filter material of a character to selectively pass one of said fluids arranged in said tubing and nipple between said partitions and a pack of filter material of a character to selectively pass the other of said fluids arranged in said nipple below its transverse partition.

WILLIAM A. BRUCE.

REFERENCES CITED

The following references are of record in the file of this patent:

UNITED STATES PATENTS

| Number | Name | Date |
|---|---|---|
| 1,649,524 | Hammond | Nov. 15, 1927 |